Feb. 14, 1950 — M. HATTAN — 2,497,081

SELF-LOCKING NUT AND METHOD OF MAKING THE SAME

Filed May 1, 1945

INVENTOR.
MARK HATTAN
BY
ATTORNEYS

Patented Feb. 14, 1950

2,497,081

UNITED STATES PATENT OFFICE 2,497,081

SELF-LOCKING NUT AND METHOD OF MAKING THE SAME

Mark Hattan, Dayton, Ohio

Application May 1, 1945, Serial No. 591,294

4 Claims. (Cl. 10—86)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to self-locking nuts and to methods of making the same. According to the disclosure of my pending application Serial No. 522,081, filed February 12, 1944, now Patent No. 2,464,808, dated March 22, 1949, a self-locking nut is provided which consists of two parts, a casing or shell which is hollow and has inturned flanges at the top and bottom, and a specially shaped helical coil spring (preferably of music wire) which is housed within the casing between the inturned flanges. The spring is closely coiled and so made that it may be threaded on a bolt or stud, and has a plurality of minute waves or deformations which are flattened out or made to assume the shape of segments of the helix, whenever the nut is assembled upon a bolt or stud. In said pending application, the amplitude of the minute waves is measurable in a direction which is parallel to the axis of the helix of the spring, but in my pending application Serial No. 558,707, now Patent No. 2,402,159, dated June 18, 1946, filed October 14, 1944, I disclose a coil spring having waves whose amplitude is measurable at right angles to said axis or radially of the nut. As the material of the coil spring is of high resiliency, the flattening out of the waves or deformations creates a high torque or resistance to turning of the nut, which is sufficient to hold the nut securely on the bolt or stud regardless of vibrations, changes in temperature or other adverse service conditions. This high torque is equally effective in either direction of turning. The coil spring necessarily is permitted a slight helical creeping within the casing, responsive to the flattening out of the waves or deformations, and subsequent restoration of the waves to their original form when the nut has been removed, but relative rotation of the coil spring and casing obviously cannot be tolerated. In the construction of the pending application, such relative rotation is obviated in part by a spiral shoulder formed on the top (inside surface) of the base flange, which the lower end of the coil spring abuts, and in part by the turning down of the upper flange of the casing into such close proximity to the upper end of the coil spring that the latter theoretically cannot turn, although it will helically creep as stated above.

The primary object of this invention is to provide an improved self-locking nut of the type indicated wherein the upper flange of the nut, as well as the lower, is provided with a helical shoulder for seating the end of the coil spring, thus making rotation of the coil spring impossible. Other objects are to provide locking means for the coil spring which requires no additional parts and which does not increase any of the dimension of the nut casing. A special feature of the invention is to devise a practicable method of making a flange integral with a nut casing and having a helical shoulder or seat on the inside.

In the accompanying drawings showing a preferred embodiment of the invention—

Figure 4:
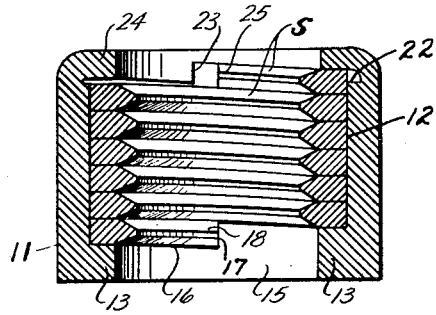
Fig. 4 is a section on line 4—4 of Fig. 3.
Figure 5:
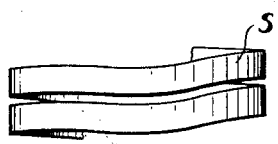
Fig. 5 is a detail elevation, on a large scale, showing part of the coil spring and some of the waves or deformations therein.

Referring particularly to the drawings, the nut casing or shell 11 is formed preferably of a metal which is capable of being locally hardened or strengthened, has a cylindrical interior wall 12, a base flange 13, and hexagonal (or polygonal) exterior walls 14. The base flange 13 has a central opening 15 large enough to clear the threads of the bolt or stud (not shown) on which the nut is to be placed. Flange 13 is preferably shaped by cold-pressing the inititially formed straight flange (not shown) with a special die until the metal of the flange and in a zone immediately adjacent thereto is compressed and strengthened. The special die mentioned above forms a spiral or helical shoulder or seat 16 on the top or inside surface of the bottom flange, the pitch angle of the spiral or helix being preferably exactly the same as the pitch angle of the coil spring S, so that the lower end of the latter lies in close contact with seat 16 as shown in Fig. 4. The step or riser 17 between the lowest and highest points on spiral seat 16 provides a radial abutment or stop against which the extremity 18 of the coil spring may press, when the nut is being removed from a stud or bolt. As so far described, the nut casing is identical with the casing of my pending application.

Figure 1:
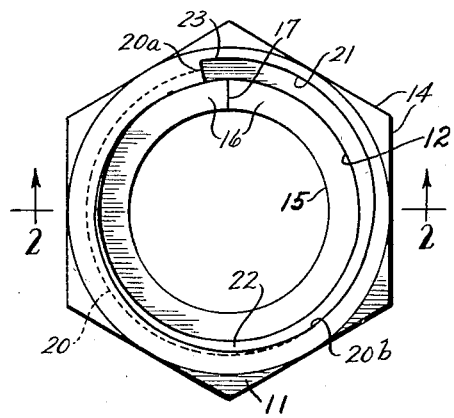
Fig. 1 is a top plan view of the nut casing or shell before the top flange is turned over.
Figure 2:
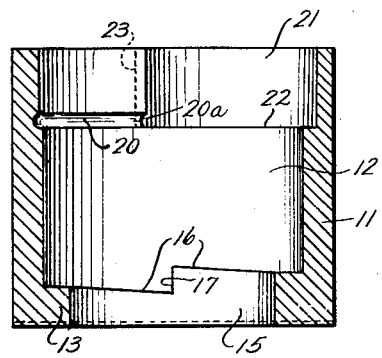
Fig. 2 is a section on line 2—2 of Fig. 1.
Figure 3:
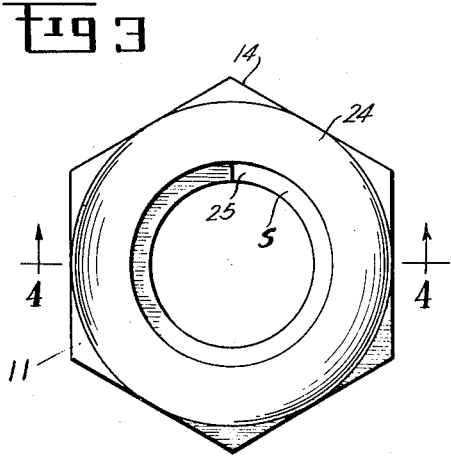
Fig. 3 is a top plan view of the casing or shell after the top flange has been turned over to lock the coil spring.

In accordance with the present invention, the upper part of the casing is so made as to be easily turned in to form a top flange integral with the body of the casing, said top flange also providing a spiral or helical seat or shoulder, but for the upper end of the coil spring. To make the upper part of the casing readily bendable, an arcuate groove 20 is cut in the casing on the inside. As indicated in Fig. 1, groove 20 extends about halfway around the casing, and is concentric with the axis of the casing, but is of varying depth, being deepest at one end 20a and merging into the wall of the casing at about the point 20b. This varying depth is due to the cutting away of the wall of the casing to form a spiral interior surface 21 which extends from the upper end of the casing to a shoulder 22 lying in a plane at right angles to the axis of the casing, and preferably in a plane which coincides with the bottom edge of the eccentric groove 20. As shoulder 22 is the end surface formed during cutting of spiral surface 21, it is of varying width, as shown in Fig. 1, being widest adjacent the end 20a of the groove and narrowing uniformly, until it finally disappears or merges into the wall of the casing. The cutting of spiral surface 21 provides a radial step or riser 23 which is adjacent the widest part of shoulder 22 and is also next to the end 20a of the groove. Obviously the groove and shoulder co-operate to make the metal at the upper end of the casing readily bendable inwardly to form the top flange 24. The top flange may be bent inwardly by spinning or by employing a die. When the metal of the casing is turned in to form the top flange, the radial step or riser 23 is also turned at right angles, and then provides an abutment for the extremity 25 of the coil spring. When the lower extremity 18 of the coil spring abuts the step or riser 17, as shown in Fig. 4, the upper extremity 25 will be spaced a sufficient distance from the radial step or riser 23 to permit the helical creeping mentioned above. This space may comprehend an angle of about 11°. The top flange provides not only a spiral shoulder for the end of the coil spring but also a locking flange which holds the spring against any movement whatever except the helical creeping.

While the preferred method calls for the shaping of the lower spiral shoulder or seat by cold-pressing with a die, and the forming of the upper spiral shoulder by the peculiar process herein disclosed, it is within the scope of my invention to reverse the procedure and form the top flange by cold-pressing, and the bottom seat by the method herein disclosed, or to form both spiral shoulders by the present method. This would require heat treating or other hardening procedures after turning the flanges inwardly, in the event the nut is to be subjected to high tensile conditions. When the nut is tightened on a bolt or stud, the top flange may be subjected to very high compression and shearing stresses, and it is quite important that this portion of the nut shall be sufficiently strong. Localized heat treating (which may be by electronic methods) may give the top or both flanges such strength that the threads on the bolt will strip before the nut casing will fail.

What I claim is:

1. A method of forming a helical seat for the end turn of a helical spring on the inner side of an inturned flange at the end of a spring casing of cylindrical bore, which consists of grooving the casing at least part way around the inside at a predetermined distance from the open end, removing metal from the inside of the cylinder wall to the same distance from the end as the groove to form a spiral seat in said side wall radially beyond the original bore, and forming that portion at the end of the bore which contains the spiral seat radially inward to a plane normal to its original position, thereby converting said spiral seat into a helical seat.

2. A method of forming a helical seat conforming to the end turn of a helical spring on the inner side of an inturned flange at the end of a spring casing of cylindrical bore, which consists of annularly grooving said bore eccentric thereto and at a predetermined distance from the end, recessing said bore in the form of one turn of a spiral starting at the bore and extending radially therebeyond and extending a distance from the end equal to the distance of said groove from the end, and forming that portion at the end of the bore which contains the spiral recess inward at ninety degrees from its original position thereby to convert the spiral recess on the inside of the bore into a helical seat on the inside of the inturned flange.

3. The method of making a lock nut of the type comprising a hollow casing and a closeby coiled helical spring inside the casing, said spring having contact on its outside with the inside wall of the casing and having the inside surfaces of its convolutions so shaped as to permit threading on the screw threaded shank of a bolt or stud, and a pair of inwardly extending flanges at opposite ends of the spring, each flange having a helical seat conforming to the end coil of the spring, said seat having a step where the helix of said seat begins and ends, and the ends of said spring being adapted to abut said steps, said method comprising boring the casing to fit the spring but leaving the lower inturned flange integral with the casing, forming the helical seat in the lower inturned flange, annularly grooving said bore at a predetermined distance from the upper end, recessing said bore in the form of one turn of a spiral, starting at the bore and extending radially therebeyond and extending a distance from the end equal to the distance of said groove from the end, placing said spring in said bore with the end of the lower turn abutting the step in said lower helical seat and forming that portion at the end of the bore which contains the spiral recess inward over the upper end of the spring, thereby converting the spiral recess on the inside of the bore into a helical recess conforming to the upper end turn of the spring with its step adjacent the end of the upper turn of the spring.

4. A self locking nut comprising, in combination, a casing having a cylindrical interior wall, and a helical spring enclosed within the casing and engaging the interior wall thereof and having a cross section adapted to be threaded on a bolt or stud, said helical spring further having a plurality of waves or deformations of sufficient amplitude to effect a gripping or locking action on the threads of the bolt or stud; a base flange integral with the casing and extending inwardly of said cylindrical interior wall, said base flange having a helically shaped seat corresponding to the end turn of the spring on the side of the flange opposite to the base of the nut; a step or riser connecting the beginning to the end of the seat, one end of the spring being adapted to abut the step or riser; a top flange integral with the casing and extending inwardly of said cylindrical wall formed by turning in the upper portion of the nut casing, said upper portion being made more readily bendable than the remainder of the casing by the provision of an arcuate groove cut in the casing on the inside and extending at least partially around the casing and being of varying depth with the greatest depth at one end, and by a spiral counterbore on the inside of the casing extending from the upper end thereof to a plane lying in the general plane of the groove; said spiral counterbore forming a radial shoulder on the inside of the casing, the shoulder being widest measured radially of the nut, at one end where it is adjacent the deepest part of the groove, and becoming progressively narrower until it finally merges into the walls of the casing whereby said top flange is provided with a helical seat similar to that of the bottom flange for the upper end of the spring, whose upper extremity is adapted to abut the step or riser formed by the helical seat of the top flange, the spring being permitted to creep helically when the nut is threaded on or removed from a bolt or stud.

MARK HATTAN.

REFERENCES CITED

The following references are of record in the file of this patent:

UNITED STATES PATENTS

| Number | Name | Date |
|---|---|---|
| 2,022,946 | Staempfli | Dec. 3, 1935 |
| 2,079,746 | Morgan | May 11, 1937 |
| 2,100,552 | Ripsch | Nov. 30, 1937 |
| 2,210,353 | Barnes | Aug. 6, 1940 |
| 2,354,810 | Haas et al. | Aug. 1, 1944 |
| 2,358,707 | Haas | Sept. 19, 1944 |
| 2,386,197 | Dawson | Oct. 9, 1945 |
| 2,387,257 | Haas | Oct. 23, 1945 |
| 2,407,879 | Haas | Sept. 17, 1946 |